United States Patent Office 3,388,508
Patented June 18, 1968

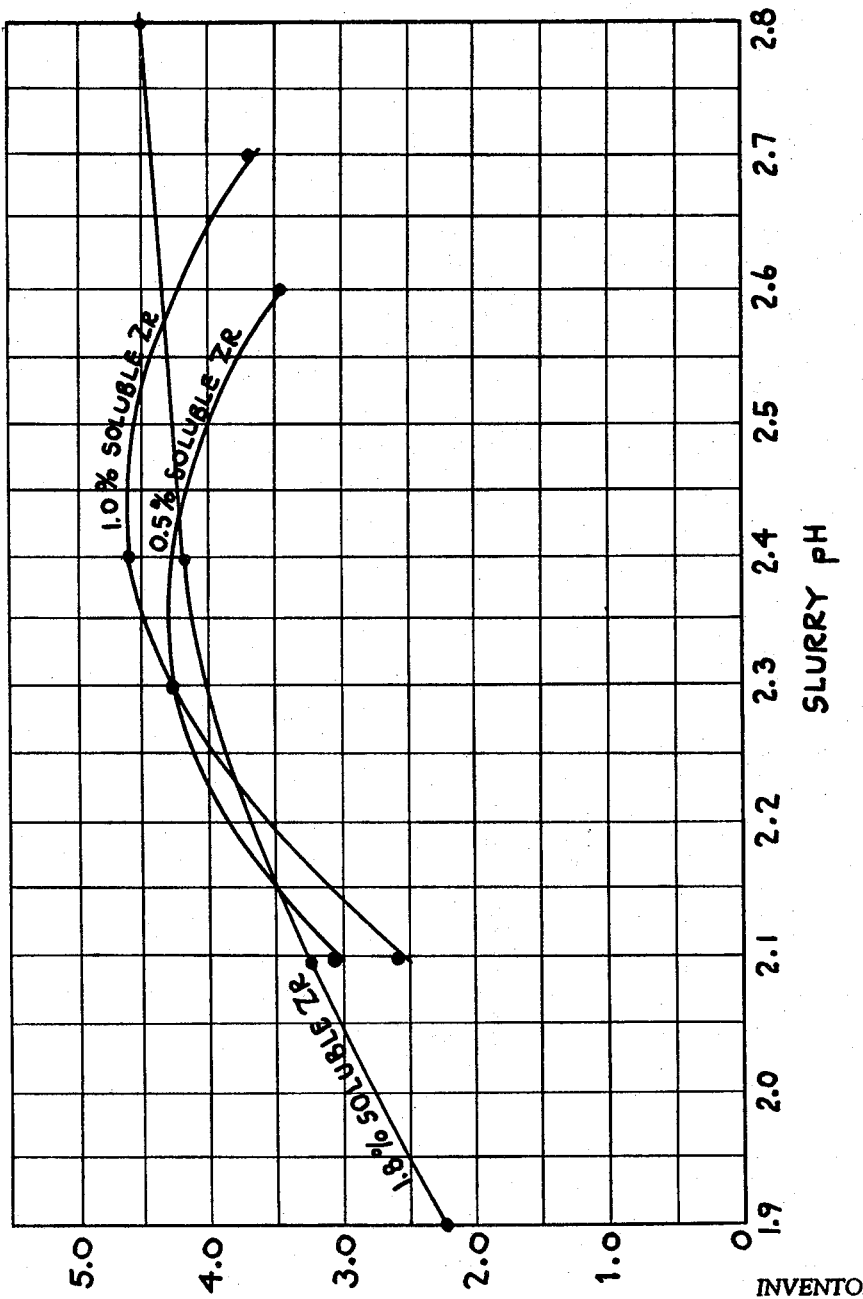

3,388,508
GLASS POLISHING COMPOSITION CONTAINING DISSOLVED ZIRCONIUM AND ZIRCONIUM OXIDE
John S. Sieger, Allison Park, Pa., and Donald E. Cox, Corpus Christi, Tex., assignors to Pittsburgh Plate Glass Company, Pittsburgh, Pa., a corporation of Pennsylvania
Continuation-in-part of application Ser. No. 403,980, Oct. 15, 1964. This application Aug. 23, 1967, Ser. No. 662,772
12 Claims. (Cl. 51—284)

ABSTRACT OF THE DISCLOSURE

A glass polishing composition is disclosed which is an aqueous slurry containing dissolved zirconium and $ZrO_2$ in solid form, and having a pH in the range of 1.5 to 4.5. Methods of polishing glass using the dissolved slurry are described. Dissolved zirconium is present in amount of at least 0.05 percent by weight. Dispersed $ZrO_2$ is present in amounts of at least 0.25 percent by weight. During polishing with this composition, pH control is described.

---

This application is a continuation-in-part of U.S. Ser. No. 403,980, filed Oct. 15, 1964 and now abandoned.

The present invention relates to improvements in glass polishing. More particularly, the present invention relates to an improved method of polishing glass and to a new and improved glass polishing composition.

It is known in the art to polish glass with materials such as rouge, zirconium oxide and rare earth abrasives containing cerium oxide. One of the difficulties in utilizing zirconium compounds is the expense incurred purchasing zirconium oxide as the abrasive material for a glass polishing composition. Another difficulty is the tendency of many zirconium oxides to form surface defects in certain polishing operations. Since cost and quality of polish dictate in great measure the advisability of utilizing one glass polishing abrasive over another, glass polishing compositions employing zirconium oxides present certain serious economic difficulties.

In accordance with the present invention, a method of polishing glass has been devised utilizing zirconium oxide and a new and novel glass polishing composition has been discovered which renders the use of zirconium oxide abrasive more economical by increasing the effectiveness of zirconium oxide as a glass polishing abrasive and minimizing its tendency to form defects. Under certain conditions the novel composition possesses vastly superior glass removal rates than those commonly experienced with conventional rouge type compositions emploped, for example, in the plate glass making industry.

In accordance with the present invention, a slurry containing at least 0.25 percent by weight $ZrO_2$ is prepared, typically 0.25 to 10 percent by weight $ZrO_2$. The slurry is an aqueous suspension of $ZrO_2$ preferably in the weight percentages above indicated, and contains a certain but definite dissolved quantity of soluble zirconium. The soluble zirconium is supplied to the aqueous suspension in the form of soluble zirconium salts exemplified by materials such as zirconyl nitrate or zirconyl hydroxychloride. The soluble zirconium salts are utilized in quantities sufficient to provide on a weight basis at least about 0.05 percent by weight soluble zirconium in the resulting solution, generally between about 0.05 and 3.5 percent by weight. The upper limit on the feed of soluble zirconium obviously is determined by the solubility limits of the particular zirconium salt employed in the aqueous solution utilized to make up the suspension. By "soluble zirconium" in the following description is meant all the zirconium in the system exclusive of that in the zirconium oxide abrasive. It has been found in accordance with this invention that by a careful regulation of the soluble zirconium content of a given solution, the abrasive concentration of the glass polishing slurry may be lowered to a very small value, 1 percent or less for example, and still a satisfactory removal rate of glass achieved during a glass polishing operation. In determining the quantity of abrasive material which should be employed in the glass polishing compositions of the present invention, the soluble zirconium content of the aqueous slurry is correlated to the zirconia or $ZrO_2$ content, since lower percentages of solid zirconia are capable of being employed when the soluble zirconium content is increased. While the range of abrasive typifying the slurries is 0.25 to 10 percent by weight $ZrO_2$, more than 10 percent $ZrO_2$ can be employed if desired.

In the practice of the instant invention, consideration of critical importance resides in the maintenance during operation of pH values of the aqueous glass polishing slurry within certain and definite ranges. It has thus been found in accordance with this invention that a pH of the aqueous suspension must be maintained within the range of about 1.5 to 4.5 in order to render the glass polishing compositions effective in producing high rates of glass removal during a glass polishing operation. Operations outside of this range give rise to glass removal rates which are not satisfactory for one or more reasons.

The particular form which the zirconium oxide abrasive material takes does not appear to be of critical importance in the glass making compositions contemplated herein, and zirconium oxides of many types may be employed. It is preferable to employ a zirconium oxide which has a high bulk density such as on the order of 30 to 50 pounds per cubic foot. Materials of this type have been found to be extremely efficient in removing glass, but a zirconium oxide of bulk density of higher or lower values may be employed with ease. The important consideration is that the soluble zirconium salts such as zirconium nitrate or hydroxychloride contained in the aqueous slurry of $ZrO_2$ must have present in that solution forming the slurry somewhere at least about 0.05 percent by weight soluble zirconium preferably between about 0.05 and 3.5 percent soluble zirconium and the slurry is maintained in a pH range of between about 1.5 to about 4.5. The soluble zirconium in the solution exhibits an effect upon the abrasive qualities of the $ZrO_2$ or zirconia contained in the slurry so that superior glass removal rates are readily achieved. In the absence of the dissolved zirconium typical glass polishing compositions containing $ZrO_2$ do not function in a manner sufficient to enable them to be satisfactory for many polishing operations, such as for plate glass. Without dissolved zirconium present and the critical pH range the slurry of zirconia cannot compete on an economic basis with the conventional rouge type materials due to the low rate of glass removal resulting therefrom, as well as its tendency to form defects on the glass surface.

FIGURE 1 shows a correlation between the quantity of glass removed at a given pH when these values are correlated to the quantity of soluble zirconium present in the glass polishing slurry.

The exact mechanism by which the instant process works is not completely understood. It is recognized that under certain conditions zirconium compounds are strongly attracted to glass. Whether such forces of attraction, operating best at the specified pH range, are involved, is not known. At any rate, operation within this range and under the conditions specified results in extremely effective polishing action.

It has been observed that when the additive-containing solution (before adding abrasive) is in the proper pH range, the appearance of a solution prepared from zirconyl nitrate is different from one prepared from zirconyl hydroxychloride, although both are extremely effective. With zirconyl nitrate, a definite amount of very fine or colloidal precipitate or suspension is formed. This is far less than the total amount of precipitate that would be formed if the additive were precipitated as zirconium hydroxide; this extent of precipitation would involve a high pH and give a slurry that is relatively ineffective by the standards of the present invention. With zirconyl hydroxychloride, a solution in the proper pH range appears clear and shows no precipitate under ordinary illumination; under very strong illumination such as that used to detect colloidal materials an extremely small amount of very fine material may be observed.

In preparing slurries in accordance with a preferred embodiment of the present invention, a sufficient quantity of zirconyl nitrate or zirconyl hydroxychloride is added to water to provide between 0.05 and 3.5 percent by weight soluble zirconium in the final slurry. Since the pH of the zirconium solution so formed is usually too low, sufficient dilute aqueous alkali solution (such as sodium hydroxide) is added, with agitation, to bring the pH within the above specified range of 1.5 to 4.5. Abrasive-grade $ZrO_2$ is then added to provide the preferred abrasive concentration of between 0.25 and 10 percent $ZrO_2$ in the resulting slurry.

In another method of preparing abrasive compositions of this type, a quantity of zirconium carbonate, such as a commercial hydrated product containing about 20 percent equivalent $ZrO_2$, is mixed with 40° Baumé nitric acid in amounts such that the $HNO_3$ content is slightly less than that stoichiometrically required to form $ZrO(NO_3)_2$. $CO_2$ is typically evolved and a clear or slightly cloudy solution is formed. Although this solution has been proven to be an effective additive without further treatment, maximum effectiveness is achieved if the solution is first heated to expel additional dissolved $CO_2$. The resulting zirconyl nitrate formed by this procedure is then used to prepare the polishing slurry by diluting it with water and adding the desired amount of $ZrO_2$ abrasive. Thus, zirconyl nitrate may be utilized as a purchased material or may be prepared for use from a relatively inexpensive commercial material by the method herein above set forth.

It has been observed that the preferable range of pH at which the polishing slurries operate most efficiently will vary somewhat depending upon the size of the polishing pad employed. Thus, while a pH within the critical range is always employed, for a given size polishing pad best operations are achieved by feeding slurries having certain preferred pH characteristics. With small polishing units using for example 2 to 4 inch diameter pads, a preferred pH range of between 3.3 and 4.2 is utilized in the slurry fed to the polishers. With medium sized pads, for example 8 to 12 inches, a pH range of between 2.2 and 2.8 is maintained in the slurry fed to the polishers. With large diameter pads, for example 25 to 30 inch diameter pads, a pH range of 1.7 to 2.4 in the slurry fed to the polishers is employed. The maintenance of pH is accomplished by adjusting the various glass polishing slurries prepared in accordance with this invention with nitric acid or hydrochloric acid (depending on whether zirconyl nitrate or zirconyl hydroxychloride is used) to render them more acidic, and with either sodium hydroxide or sodium carbonate to render them more alkaline. It is preferred in imparting alkalinity to the glass polishing slurries of the instant invention that sodium hydroxide be employed as this has been found most effective.

In achieving the desired pH value once the slurry is made up a pH reading is taken. The addition of acid or alkali will then be called for depending on the results of the reading taken to provide a slurry which falls within the preferred pH range. During operations due to the removal of glass and the subsequent pickup by the slurry of alkali in the solution, it will become necessary to readjust the pH by the addition of acid to maintain it at a level initially set. Any over acidification will of course require correction by further alkali addition. In operating in accordance with this invention, thus, the slurries may be removed from the polishing surface, collected, and the pH adjusted continuously or at intervals. They may then be returned to the polishing surface once the pH adjustment has been made to provide effective compositions which are maintained within the critical pH range.

It has been discovered also in accordance with the instant invention that there is a correlation between the soluble zirconium content in the solution and the slurry pH such that with larger quantities of soluble zirconium present, it is possible to operate at pH ranges higher than the preferred pH range for a given size polishing pad. Thus, as shown in FIGURE 1 with a 1.8 percent soluble zirconium present, it was possible to achieve high glass removal rates even while the pH exceeded the preferred 2.8 value for the size pad employed. While this correlation between the soluble zirconium content of the glass polishing slurry appears to hold true as concentration is increased to a certain point, operations involving pH values beyond 4.5 regardless of the soluble zirconium content have not been effective in providing adequate glass removal rates. By adequate glass removal rates are meant glass removal rates which exceed the glass removal rate of a conventional copperas-rouge glass polishing composition by more than 10 percent.

Because of the expense of the materials involved in utilizing a zirconyl nitrate-zirconia glass polishing slurry composition, it is extremely important that high rates of removal be obtained in order to render the process economically attractive over less expensive materials such as rouge-copperas mixture. For this reason, while certain zirconium oxide-zirconyl nitrate compositions will remove glass during a polishing operation at the same level that a rouge-copperas mixture will remove glass, they are not feasible because the removal rates are too slow when the high cost of materials involved in the glass polishing composition itself are taken into consideration.

From the point of view of maximum polishing effectiveness, slurries prepared with zirconyl hydroxychloride as the starting material show a somewhat higher maximum glass removal rate than ones prepared from zirconyl nitrate, although both are very much more effective than rouge-copperas slurries or than zirconium oxide slurries containing no additive. The reason for the somewhat better performance of zirconyl hydroxychloride is not completely understood. It is thought to be related to the fact that little or no precipitate forms when solutions prepared from the hydroxychloride are adjusted to the proper critical pH range. The formation of too much precipitate is thought to interfere with polishing action by coating or "sliming" the polishing pad or otherwise adversely affecting the interaction between the pad, the abrasive-additive combination, and the glass surface. If either the nitrate or hydroxychloride slurries are taken to too high a pH, a large volume of a gelatinous, rapidly settling precipitate is formed; the decrease in effectiveness at high pH's is thought to be due to this effect.

For a more complete understanding of the present invention, reference is made to the following examples which are illustrative of several methods which may be employed in conducting the present invention. All polishing examples given herein below were run on a laboratory standard test machine.

The machine consisted of a driven, rotating, horizontal table on which a glass plate was held by vacuum. A felt faced polishing tool is lowered onto the glass and is made to rotate by driving it from above and also is made to oscillate across the glass. Abrasive slurry is dropped onto the glass beside the rotating polishing block. The various speeds of rotation and oscillation and the feed rate of the abrasive and the pressure on the glass are controlled to give reproducible results. The device contained a smooth, circular metal table equipped with a central vacuum connection. The table was 19 inches in diameter and in operation a flat, 19 inches in diameter by ¼ inch thick, circular glass test plate was held on the table by vacuum. A piece of cloth separated the glass from the metal to prevent damage to the glass. The table and glass were driven as a unit at a controlled speed by an electric motor. The polishing block consisted of a solid 10 inch diameter cattle hair felt cemented to a metal back plate. The plate was attached through a second metal adapting plate to a rotating vertical shaft and was arranged to permit positive driving of the polishing block by its second motor. In operation the block was driven in the same direction as the glass. The entire block and shaft were oscillated across the surface of the rotating glass by a third motor so that the rotating periphery of the felt block overhung the seamed edge of the glass by ½ inch at the furthermost point of the oscillation. At the center of the oscillation stroke the center of the block shaft was about 1 inch from the center of the table. The pressure on the felt was regulated by the addition of weights to the top of the shaft. Abrasive slurry was fed, at a controlled rate, by a pump from an agitated slurry reservoir, to the top surface of the glass at a point about midway between the center and edge of the plate. Concentrations of abrasive and additives and the pH of the slurry were adjusted before beginning the polishing operation. Provision was made for flushing residual abrasive slurry off the plate with water after completion of the test.

Before each series of experiments detailed in the examples below, a "break-in" period of operation, usually of about 20 minutes, was employed to condition the polishing pad with the slurry to be tested and enhance the reproducibility of results. In each of the examples the percent abrasive means the weight of abrasive solids added to 100 parts of non-abrasive containing liquid.

EXAMPLE 1

A concentrated zirconyl nitrate solution (52° Baumé) was added to water in a quantity sufficient to provide about one percent soluble zirconium in the final aqueous slurry. The pH of the slurry at this point was adjusted with NaOH solution, with agitation, to provide a pH of 2.1. For each 100 parts of this additive-containing mixture there were added 6.5 parts by weight of dense, micronized $ZrO_2$ having a bulk density of 45 pounds per cubic foot. Three runs were made utilizing this slurry to polish a glass plate, each run consisting of a 20 minute polishing operation. The glass removal rate amounted to 2.74 grams, 2.5 grams, and 2.57 grams, respectively, for each of the three runs, and an average glass removal rate of 2.6 grams for a 20 minute cycle was achieved. The appearance of the finished glass was good with no waterpick present.

By way of comparison, two runs were made with zirconium oxide at 6½ percent concentration, with no additive. The pH of the slurry was 7.2. Glass removal rates of 1.15 and 1.35 grams per 20 minute operation were obtained, and a severe waterpick defect was produced on the plate. Thus, the zirconium oxide by itself is inferior in performance even to rouge-copperas slurries.

As a further comparison, a run was made with zirconium oxide at 6½ percent concentration, with no soluble zirconium additive, but with the pH corrected to 2.0 with nitric acid. A glass removal rate of 0.64 gram per 20 minute operation was obtained, and a severe waterpick defect was produced on the plate.

EXAMPLE 2

A slurry was prepared as in Example 1 and the pH adjusted with NaOH to provide a pH of 2.2. The soluble zirconium content was 1 percent by weight. The $ZrO_2$ content of the slurry amounted to 6.5 percent by weight added solids. Three runs of 20 minutes each were made utilizing this slurry to polish glass sheets and glass removal rates of 3.91, 4.03, and 4.12 grams per 20 minutes, respectively, were achieved for each of the runs. The average glass removal rate for the three runs amounted to 4.02 grams per 20 minute cycle. The finished glass had no waterpick present.

EXAMPLE 3

A glass polishing slurry was prepared as in Example 1 and adjusted with NaOH to provide a pH of 2.4. The soluble zirconium content of the slurry was 0.97 percent by weight. The $ZrO_2$ content of the slurry was 6.5 percent by weight added solids. Three runs to polish glass sheets were made utilizing this slurry and glass removal rates of 4.5, 4.6, and 4.73 grams, respectively, per 20 minute cycle were achieved. The average glass removal rate for all three runs amounted to 4.62 grams per 20 minute cycle and the finished glass had no waterpick present.

A plurality of runs was made to determine the effect of operating at pH values outside of the preferred range for the polishing machine used in the above examples.

EXAMPLE 4

An aqueous slurry was prepared as in Example 1. No alkali was added, and the pH was 1.8. The soluble zirconium content was 1.1 percent by weight and the added $ZrO_2$ content of the slurry was 6.5 percent by weight. After the break-in period, one run was made with this slurry. A glass removal rate of 1.4 grams per 20 minute interval was achieved, and the plate contained a severe waterpick defect.

EXAMPLE 5

A series of runs was made utilizing a pH of 2, a soluble zirconium content of 1 percent by weight and a $ZrO_2$ content of 6.5 percent by weight. The slurry was prepared as in Example 1 and two 20 minute runs were made using this slurry to polish glass sheets. Glass removal rates of 2.04 and 1.94, respectively, were experienced for the two runs with an average glass removal rate of 1.99 being achieved.

To determine the advisability of operating the pH considerably above the critical range, the following examples were run.

EXAMPLE 6

A glass polishing slurry was prepared as in Example 1, the soluble zirconium content being 0.87 percent by weight. The pH adjusted with sodium hydroxide to provide a pH of 5.1. The $ZrO_2$ content of the slurry was maintained at 6.5 percent by weight. Three runs were made utilizing this slurry to polish glass sheets and glass removal rates of 1.8, 1.72, and 1.63, respectively, per 20 minute intervals were achieved in each of the three runs. The average glass removal rate for 20 minutes was 1.72.

EXAMPLE 7

A second series of experiments was run in which a glass polishing composition was prepared as in Example 1 and adjusted with sodium hydroxide to a pH of 7.8. The soluble zirconium content was 0.85 percent by weight. The $ZrO_2$ content was stabilized at 6.5 percent by weight. Three runs of 20 minute intervals each were made utilizing this glass polishing composition to polish glass sheets and glass removal rates of 1.85, 1.59, and 1.56 grams, respectively, per 20 minute interval were achieved in each of the runs. The average glass removal rate for the three runs was 1.67 grams per 20 minute interval.

To determine that the slight difference in soluble zirconium content utilized in the runs in Examples 6 and 7 had no direct effect upon the comparison of these runs with Examples 1 through 4, a series of three experiments was run in which the soluble zirconium content was regulated between 0.53 percent and 0.55 percent. These runs are set forth below.

EXAMPLE 8

A glass polishing slurry was prepared as in Example 1. The soluble zirconium content was 0.53 percent by weight. The pH was adjusted with sodium hydroxide to 2.6 and the $ZrO_2$ content of slurry was 6.5 percent by weight. Three runs were made on glass sheets with this slurry, and glass removal rates of 3.35, 3.57, and 3.52 grams, respectively, per 20 minute intervals were achieved for each of the runs. The average glass removal rate for all three runs was 3.48 grams per 20 minutes. The glass sheet was clear and no waterpick was present.

EXAMPLE 9

A series of two runs was made utilizing a glass polishing composition prepared as in Example 1 which contained soluble zirconium at 0.54 percent by weight. The $ZrO_2$ content of the slurry was 6.5 percent by weight and the pH was adjusted with sodium hydroxide to a value of 2.3. Two runs of 20 minutes each were made to polish glass sheets with this slurry and glass removal rates of 4.28 grams and 4.27 grams, respectively, per 20 minutes were obtained. No waterpick was present on the glass sheets polished.

EXAMPLE 10

A third set of runs was made utilizing a soluble zirconium content of 0.55 percent by weight. The slurry was prepared as in Example 1. The pH was 2.1 and a $ZrO_2$ content of 6.5 percent by weight was employed. At the end of two 20 minute runs using this slurry to polish glass sheets, glass removal rates of 3.08 grams and 3.09 grams, respectively, per 20 minute intervals were obtained. No waterpick was present on the glass sheet.

EXAMPLE 11

A zirconium nitrate solution was prepared by dissolving commercial zirconium carbonate (approximately 20 percent equivalent $ZrO_2$ content) in 40° Baumé $HNO_3$. This solution was diluted with water to provide 0.7 percent soluble zirconium in the adjusted solution and the pH was adjusted with sodium hydroxide to a pH of 2.4. $ZrO_2$ abrasive was then added to provide a 6.5 percent concentration of added abrasive. Three runs were made with the slurry to polish a glass sheet, each run lasting for 20 minutes. Glass removal rates of 3.65, 3.96, and 3.89, respectively, per 20 minutes were obtained, with the average glass removal rate being 3.83 grams per 20 minutes. No waterpick was found in the finished product.

EXAMPLE 12

Three runs were made utilizing an aqueous slurry prepared as in Example 11. The slurry was adjusted to a pH of 2.6. The soluble zirconium content was 0.7 percent by weight. The $ZrO_2$ content of the slurry was 6.5 percent by weight. Three runs of 20 minutes each were conducted with the slurry to polish glass sheets and glass removal rates of 3.45, 3.47, and 3.56 grams, respectively, were obtained for each of the runs. The average glass removal rate for each 20 minute interval was 3.49 grams. No waterpick was observed in the finished product.

EXAMPLE 13

A further series of runs was made in which the procedure of Example 11 was followed with the exception that the zirconium carbonate-nitric acid solution was heated to a temperature of about 75° C. prior to using it to form the aqueous slurry of zirconium oxide. The zirconium oxide slurry had a concentration of 6.5 percent $ZrO_2$. The soluble zirconium content of the solution was maintained at 0.7 percent by weight and the pH was adjusted with sodium hydroxide to 2.6. Three runs were made with this slurry to polish glass sheets, each lasting for 20 minutes, and glass removal rates of 4.26, 4.08, and 3.86 grams, respectively, were obtained. The average glass removal rate for each 20 minute interval was 4.07 grams. No waterpick was observed in the finished product.

EXAMPLE 14

Further runs were made with the slurry prepared utilizing the procedures of Example 13. The slurry pH was adjusted to 2.3. A soluble zirconium content of 1 percent by weight was employed. The $ZrO_2$ content of the slurry was 6.5 percent by weight. Three runs of 20 minutes each were made with this slurry to polish glass sheets and glass removal rates of 4.2, 4.25, and 4.34 grams, respectively, per 20 minutes were obtained for each of the three runs. The average glass removal rate for each 20 minutes was 4.26 grams. No waterpick was observed in the finished product.

It can be readily seen from an examination of the examples set forth above and FIGURE 1 that the glass polishing composition and the method herein described for polishing glass are extremely sensitive to pH control. Thus, operations within the critical pH range result in astoundingly rapid glass removal rates.

EXAMPLE 15

A glass polishing slurry was prepared as in Example 1 utilizing a soluble zirconium content of 0.92 percent by weight. The $ZrO_2$ content was 6.5 percent by weight. The pH was adjusted by utilizing sodium carbonate to a pH of 2.5. Three runs were made using this slurry to polish glass sheets. Glass removal rates of 4.71, 4.71, and 4.00, respectively, were obtained for each of the three 20 minute runs. The average removal rate per 20 minutes was 4.47 grams. No waterpick was observed in the finished glass product.

EXAMPLE 16

A glass polishing slurry containing 6.5 percent of $ZrO_2$ was prepared as in Example 1. The soluble zirconium content was 0.9 percent by weight. The pH was adjusted by utilizing sodium carbonate to a pH of 3.0. Three runs were made with this slurry to polish glass sheets and glass removal rates of 2.75, 2.68, and 2.72 grams, respectively, were obtained. The average glass removal rate was 2.72 grams per 20 minutes. No waterpick was observed in the finished product.

EXAMPLE 17

A glass polishing slurry was prepared by adding to water a 15 percent by weight Zr solution of zirconyl hydroxychloride (ZrOOHCl) in a quantity sufficient to provide 1.6 percent by weight soluble zirconium in solution. The pH of the solution was adjusted with NaOH solution, with agitation, to provide a pH of 2.2. For each 100 parts of this solution there was added 7 parts by weight of dense micronized $ZrO_2$ having a bulk density of 47 pounds per cubic foot. Three runs were made utilizing this slurry to polish a glass plate, each run consisting of a 20 minute polishing operation. The glass removal rate amounted to 5.71 grams, 5.85 grams and 6.03 grams, respectively, for each of the three runs and an average glass removal rate of 5.9 grams for a 20 minute cycle was achieved.

While the invention has been described with reference to certain specific examples and illustrative embodiments, it is to be understood that the invention is not to be limited thereby except insofar as to accompany the claims.

We claim:
1. A glass polishing composition comprising an aqueous slurry containing at least 0.05 percent by weight dissolved zirconium and having dispersed therein in solid form at least 0.25 percent by weight of $ZrO_2$, said glass polishing composition having a pH in the range of 1.5 to 4.5.

2. The glass polishing composition of claim 1 wherein the $ZrO_2$ is present in an amount between 0.25 and 10 percent by weight, and wherein the slurry contains between about 0.05 and 3.5 percent by weight dissolved zirconium.

3. The glass polishing composition of claim 1 wherein the pH is between 2.2 and 2.8.

4. A method of polishing glass comprising subjecting a glass surface to the polishing action of a polishing surface having interposed between the glass surface and the polishing surface an aqueous slurry containing at least 0.05 percent by weight dissolved zirconium and having dispersed therein at least 0.25 percent by weight $ZrO_2$, the pH of the aqueous slurry fed during the polishing operation being maintained at between 1.5 and 4.5.

5. The method of claim 4 wherein the slurry contains between 0.25 and 10 percent by weight $ZrO_2$ and between about 0.05 and 3.5 percent by weight dissolved zirconium.

6. The method of claim 4 wherein the pH of the slurry is maintained during the polishing operation at between 2.2 and 2.8.

7. The method of claim 4 wherein the $ZrO_2$ has a bulk density of between 25 to 75 pounds per cubic foot.

8. A method of polishing glass comprising subjecting glass to the polishing action of a polishing surface, having interposed between the glass surface and the polishing surface an aqueous slurry containing between 0.05 and 3.5 percent by weight dissolved zirconium and having dispersed therein in solid form between 0.25 and 10 percent $ZrO_2$ adjusting the pH of the slurry fed to provide during the polishing operation a pH range of between 1.5 and 4.5, said pH adjustment being made by the addition to the slurry of a member of the group consisting of sodium hydroxide, sodium carbonate, nitric acid, and hydrochloric acid.

9. A method of polishing glass comprising subjecting a glass surface to the polishing action of a polishing surface having interposed between the glass surface and the polishing surface an aqueous slurry containing between 0.25 and 10 percent $ZrO_2$ and having dissolved therein between 0.05 and 3.5 percent by weight dissolved zirconium, maintaining the pH of the slurry fed during polishing at a pH of between 1.5 and 4.5 by adding a member of the group consisting of nitric acid and hydrochloric acid to said slurry when the pH exceeds 4.5 until it falls below 4.5 but above 1.5 and adding a member of the group consisting of sodium hydroxide and sodium carbonate to the slurry when the pH falls below 1.5 until the pH rises above 1.5 but below 4.5.

10. The composition of claim 1 wherein the dissolved zirconium is supplied from an aqueous solution of zirconium carbonate and nitric acid.

11. A method of polishing glass comprising subjecting a glass surface to the polishing action of a polishing surface having interposed between the glass surface and the polishing surface an aqueous slurry containing between 0.05 and 3.5 percent by weight dissolved zirconium, said dissolved zirconium being supplied thereto from a member of the group consisting of zirconyl nitrate and zirconyl hydroxychloride and said slurry having dispersed therein between 0.25 and 10 percent by weight of $ZrO_2$, the pH of said slurry fed during polishing being maintained at between 1.5 and 4.5.

12. A glass polishing composition consisting essentially of an aqueous slurry containing 0.05 and 3.5 percent by weight dissolved zirconium and having dispersed therein in solid form between 0.25 and 10 percent by weight of $ZrO_2$, said glass polishing composition having a pH in the range of 1.5 to 4.5.

References Cited
UNITED STATES PATENTS

| | | |
|---|---|---|
| 2,955,031 | 10/1960 | Bliton et al. |
| 2,996,369 | 8/1961 | Harris et al. |
| 3,071,455 | 1/1963 | Harman et al. |
| 3,097,083 | 7/1963 | Silvernail. |
| 3,123,452 | 3/1964 | Harris et al. |
| 3,131,039 | 4/1964 | Nonamaker. |
| 3,254,949 | 6/1966 | Clearfield. |

DONALD J. ARNOLD, *Primary Examiner.*